United States Patent
Hansen

(10) Patent No.: US 6,742,799 B1
(45) Date of Patent: Jun. 1, 2004

(54) HITCH ADAPTER

(76) Inventor: Richard C. Hansen, 3943 N. Faraday, Boise, ID (US) 83713

( * ) Notice: Subject to any disclaimer, the term of this patent is extended or adjusted under 35 U.S.C. 154(b) by 0 days.

(21) Appl. No.: 10/338,588

(22) Filed: Jan. 6, 2003

(51) Int. Cl.[7] .................................................. B60D 1/52
(52) U.S. Cl. .................. 280/495; 280/491.5; 280/416.1; 280/500
(58) Field of Search ............................... 280/495, 416.1, 280/405.1, 406.1, 407, 491.5, 491.1, 409, 500, 501, 502; D12/162

(56) References Cited

U.S. PATENT DOCUMENTS

| | | | | |
|---|---|---|---|---|
| 3,768,837 A | * | 10/1973 | Reese | 280/495 |
| 3,964,768 A | * | 6/1976 | Reynolds | 280/495 |
| 4,648,617 A | * | 3/1987 | Hannappel | 280/304.3 |
| 4,662,647 A | * | 5/1987 | Calvert | 280/490.1 |
| 5,102,156 A | | 4/1992 | Fink et al. | 280/495 |
| 5,149,122 A | | 9/1992 | Helber | 280/491.2 |
| 5,193,837 A | | 3/1993 | Fink et al. | 280/495 |
| 5,511,813 A | | 4/1996 | Kravitz | 280/495 |
| 5,586,702 A | | 12/1996 | Sadler | 224/521 |

\* cited by examiner

Primary Examiner—Avraham Lerner
(74) Attorney, Agent, or Firm—Frank J. Dykas; Derek H. Maughan; Robert L. Shaver

(57) ABSTRACT

A hitch adapter for connecting at least one accessory, such as a bicycle carrier, a motorcycle carrier, a platform for hauling cargo, a lift platform, a storage compartment, a truck bed extenders or a roof rack extender, to a receiver hitch.

1 Claim, 5 Drawing Sheets

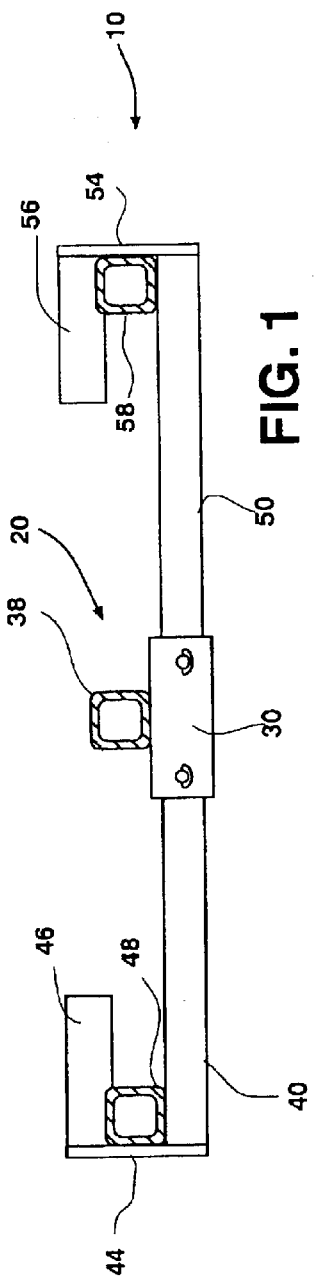
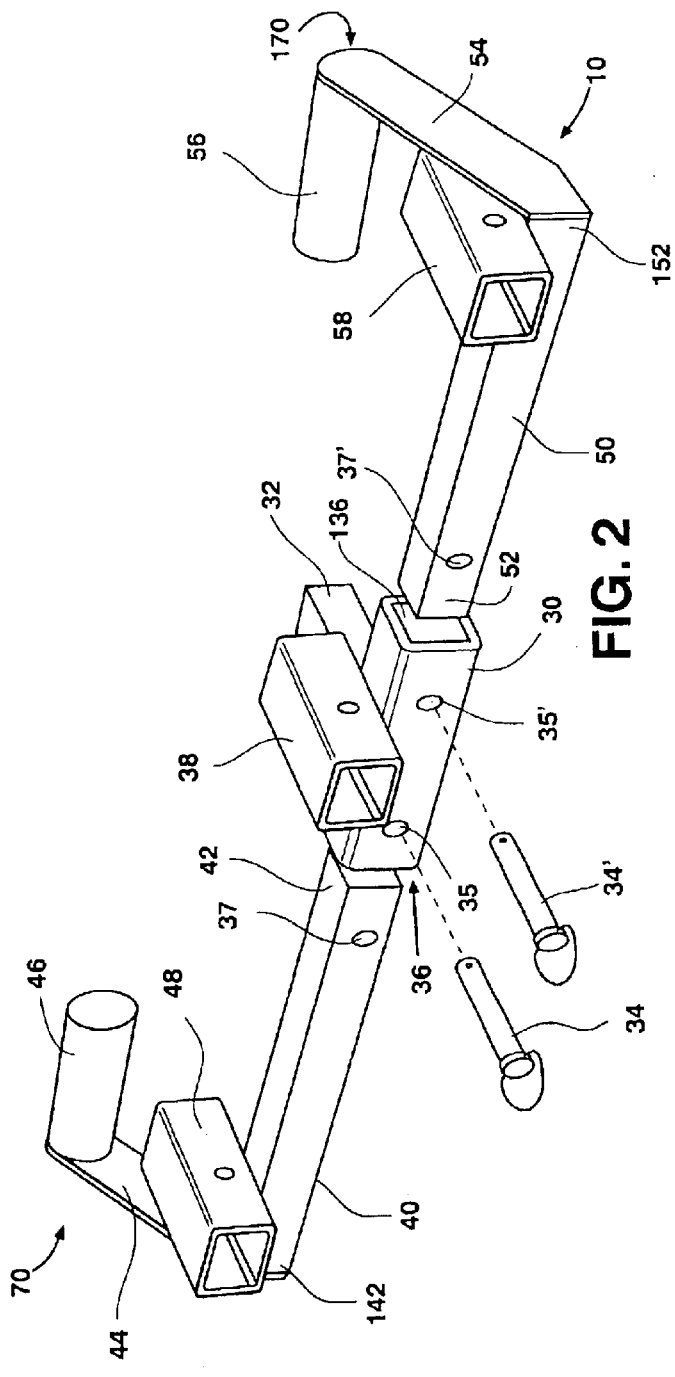

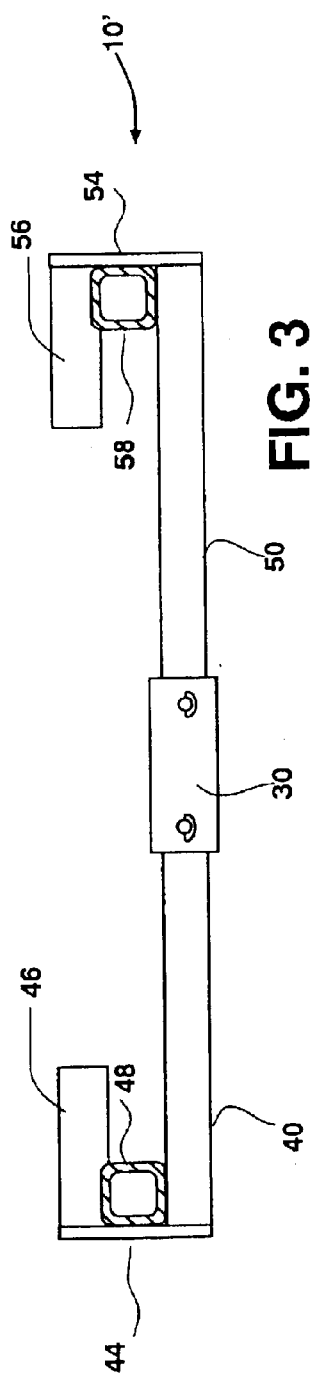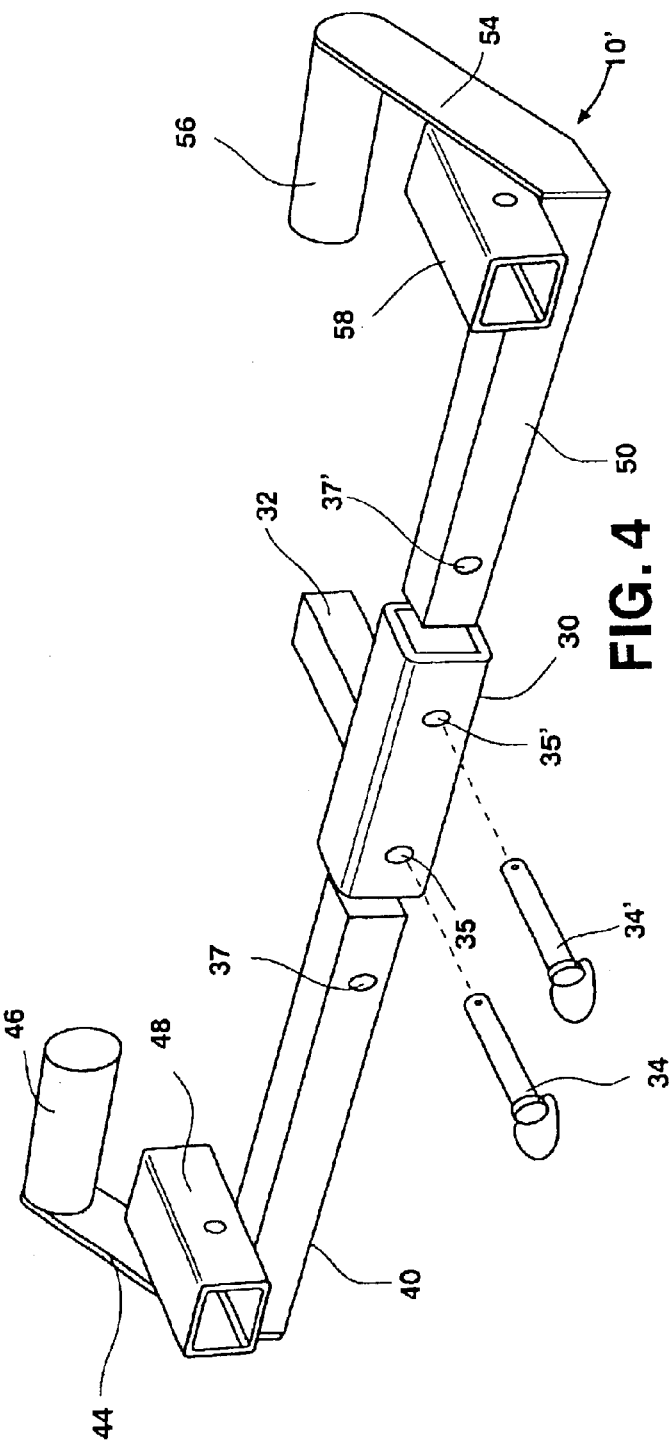

HITCH ADAPTER

BACKGROUND OF THE INVENTION

1. Field of the Invention

The present invention generally relates to vehicle attachments, and more particularly relates to accessories configured for attachment to a trailer hitch receiver of a vehicle or "receiver hitch."

2. Background Information

Motor vehicles such as pickup trucks, vans, automobiles, motor homes, etc., are typically constructed to have a pair of mutually-opposing parallel frame members or rails on which is mounted a body and front and rear bumpers. To enable towing of boats, camper trailers, motorcycle trailers, and other recreational or commercial trailers, these motor vehicles must be adapted to allow the trailer to be attached to the rear of the vehicle. Typically, a receiver ball is mounted on the center of the rear bumper of the motor vehicle, and the trailer is then coupled to the receiver ball. However, the disadvantage of this arrangement is the limited load carrying capacity of bumpers. In addition, many modern automobiles do not have rear bumpers designed to support the load of a trailer or permit attachment of a receiver ball.

Because of the foregoing, receiver hitches have been developed that attach directly to the motor vehicle frame rails. This transfers the load of the trailer directly to the vehicle frame, where heavier loads can be tolerated. In addition, receiver tubes have been developed that are stronger and enable coupling with a greater variety of trailer tongues and receiver hitch accessories. Such receiver tubes are configured for receipt of hitch accessories, including posts bearing trailer hitch balls, bicycle racks, platforms, dump buckets, motorcycle carriers, bed extenders, roof rack extenders, etc.

What is needed is an apparatus for allowing receiver hitch accessories to be attached to such a receiver hitch that attaches to the motor vehicle frame rails, this apparatus configured to be easily installed and uninstalled so that a user can utilize the receiver hitch with or without the invented hitch adapter. Embodiments of the present invention solve this need.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a hitch adapter for connecting at least one accessory to a receiver hitch.

In one embodiment of the invented hitch adapter, this receiver hitch comprises a receiver tube extending generally perpendicular to a hitch frame. This receiver hitch having a frame mounted to the frame of the vehicle. The receiver tube is configured for receiving an engaging lube of a hitch accessory. The invented hitch adapter comprises an adapter body, this adapter body comprising an engaging portion or "adapter bracket" configured via an engaging tube to releasably attach to the hitch frame at the receiver tube. The adapter body further having at least one accessory connection receiver for receiving an engaging tube of a hitch accessory, for instance an engaging tube extending from a platform.

In another embodiment of the present invention, the present invention comprises a hitch adapter for connecting an accessory to a receiver hitch. Such a receiver hitch having a crossbar extending between a frame first end and a frame second end. The frame first end is connected to a vehicle frame first portion and the frame second end is connected to a vehicle frame second portion. The hitch frame further comprising a receiver tube extending generally perpendicular to the crossbar rearward from the vehicle. This receiver tube for receiving the engaging tube of a hitch accessory. The invented hitch adapter comprises an adapter body having a first end extending to a second end. This first end comprising a first frame adapter bracket and the second end comprising a second end frame adapter bracket. The first and second adapter brackets are configured to releasably engage the respective frame first and second ends. The adapter body further comprising an engaging tube configured for releasable engagement to the receiver tube and at least one accessory connection receiver for receiving a connection portion of a hitch accessory.

In another embodiment of the present invention, the present invention comprises a hitch adapter for connecting an accessory to a receiver hitch. This receiver hitch having a crossbar that extends between a frame first end and a frame second end. The frame first end connecting to a vehicle first frame portion and the frame second end connecting to a vehicle second frame portion. The hitch frame further comprising a receiver tube that extends generally perpendicular to the crossbar. The receiver tube for receiving an engaging tube of a hitch accessory. The invented hitch adapter comprises an adapter body, this adapter body further comprising a first arm piece, a second arm piece, and a linkage piece. This adapter body for providing a connection between the accessory and the receiver hitch. The first arm piece comprising a first frame adapter bracket configured to releasably engage the frame first end and at least one accessory connection receiver for receiving a connection portion of the accessory. The second arm pieces comprising a second end adapter bracket configured to releasably engage the frame second end and at least one accessory connection receiver for receiving a connection portion of an accessory. The linkage piece configured for releasable engagement of the releasable engagement to the receiver tube and further comprising a first arm connection for connecting with the first arm and a second arm connection for connecting with the second arm.

It is a first object of the present invention to provide a hitch adapter or "accessory connector" that can be easily installed and uninstalled from the vehicle.

It is another object of the present invention to provide a hitch adapter that connects with the receiver hitch receiver tube for a first point of contact, and which also contacts with at least one other portion of the receiver hitch assembly and/or the vehicle so as to create a more stable connection.

It is another object of the present invention to provide for a hitch adapter having a hitch extender for allowing the receiver hitch to be installed additionally upon the hitch adapter.

Still other objects and advantages of the embodiments of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIG. 1 shows a first side view of one embodiment of the present invention.

FIG. 2 shows an exploded perspective view of the embodiment of the invention shown in FIG. 1.

FIG. 3 shows a first side view of a second embodiment of the present invention.

FIG. 4 shows the exploded, perspective view of the embodiment of FIG. 3.

DESCRIPTION OF THE PREFERRED EMBODIMENTS

Figure 5:
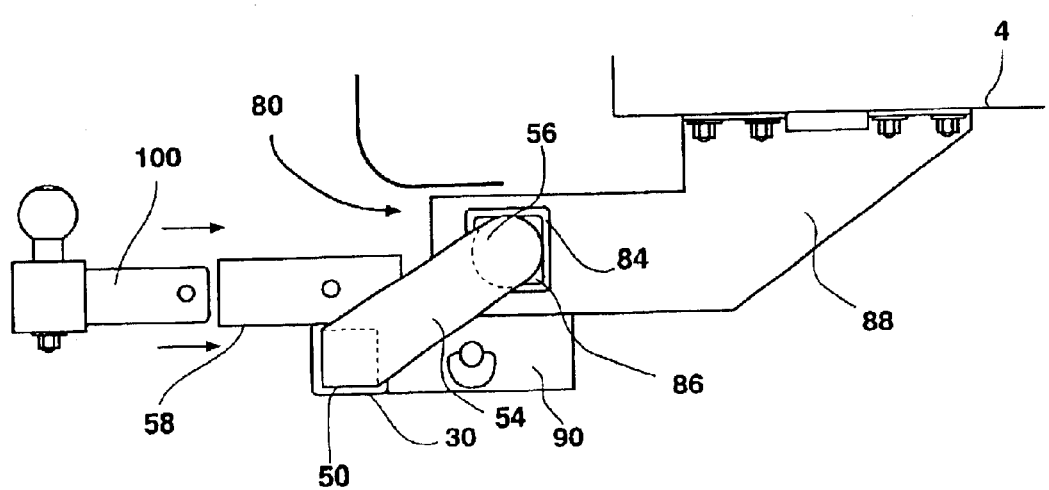
FIG. 5 shows a side view of one embodiment of the present invention installed on a receiver hitch of a vehicle.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring to FIGS. 1–7, the preferred embodiments of the present invention are shown.

Referring initially to FIG. 1, shown is one embodiment of the invented hitch adapter 10. This accessory hitch connector 10 having an adapter body 20. This adapter body 20 being is made up of a linkage piece 30, a first arm 40, and a second arm 50. It is preferred that the present invention be comprised of these three separate portions, however it is expressly envisioned that these portions in total or in part may be combined together as one or more unitary portions. In example, the first arm, linkage, and second arm could all be connected together, the linkage piece of the first arm could be one unit, the linkage piece in the second unit could be one unit, etc.

Referring to FIGS. 1 and 2, the linkage piece 30 is utilized to link the first arm 40 to the second arm 50. This linkage piece 30 further having an engaging tube 32 configured for engagement with a standard receiver hitch receiver portion or "receiver tube." The engaging tube shown comprises an elongated square tube or flange for insertion into the receiver tube of a standard receiver hitch. In use, this engaging tube 32 would be locked within the receiver tube in the standard manner. The utilization of an engaging tube 32 preferred, however less preferred embodiments could be created which do not have engaging tubes but instead rely on their connection via the frame adapter brackets (described below).

This embodiment of a linkage piece 30 defines at least one pin hole 35, 35' for cooperating with one or more pins 34, 34' for interlocking with at least one pin hole 37, 37' located in at least one arm 40, 50, thereby releasably locking the arms onto the adapter body. Additionally, the adapter body could be elongated and the arms shortened, with a plurality of holes provided within the arms thereby allowing for easy adjustment to the width of the receiver hitch assembly upon which the present invention is installed. Other manners and methods of connecting the arms to the linkage are also envisioned, including but not limited to pins, screws, bolts, welds, friction fits, mechanical means, etc.

It is preferred that the linkage piece 30 of the adapter body further comprise a hitch extender 38. This hitch extender 38 is for allowing for a receiver hitch accessory, including trailer hitch balls, to be attached to the receiver hitch adapter. This hitch extender 38 may be located at any part of the linkage piece 30, including (but not limited to) above the linkage piece (as shown), below the linkage piece, and flush with the upper surface of the linkage piece. In such a manner, the hitch adapter may be able to provide for the connection of a trailer (or other hitch accessory) to the hitch while still serving, through use of the accessory connection receivers 48, 58, as a point for attaching other accessories.

The first arm 40 is configured to cooperatively innerfit with and connect to the linkage 30. In the embodiment shown, the first arm 40 has a generally tubular first portion 42 able to be inserted into the generally tubular first end 36 of the linkage portion 30 and affixed thereon through use of a pin 34 inserted through at least one pin hole 35 furthermore through an arm pin hole 37. Ideally, these pinholes would extend completely through the linkage piece and the arm, extending out of the back therein, for allowing a cotter key or other attachment to be inserted into the distal end of the pin. However, other manners and methods of attaching the two pieces are also envisioned.

While it is preferred that the first arm piece and the linkage piece be two separate pieces able to be connected and disconnected from one another, it is also envisioned that these two pieces could be one integral piece.

The second end 142 of the first arm 40 comprises a connector 70 for connecting the second end 142 of the first arm to the receiver hitch frame and/or the frame of the vehicle. In this embodiment, extending from the second end 142 of the first arm 40 is a flange 44. This flange 44 further comprises a frame adapter bracket 46 able to be inserted into the axial bore of the crossbar of the receiver hitch. Likewise, other methods of connecting the frame adapter bracket to the crossbar of the hitch and/or the frame are also envisioned. The first arm 40 further preferably comprising at least one accessory connection receiver 48 for receiving therein the connector portion of an accessory.

The second arm 50 configured to cooperatively innerfit and connect with the linkage 30. In the embodiment shown, the second arm 50 has a generally tubular first portion 52 able to be inserted into the generally tubular second end 136 of the linkage portion 30 and affixed thereon through use of a pin 34' inserted through at least one pin hole 35' furthermore through an arm pin hole 37'. Ideally, these pinholes would extend completely through the linkage piece and the arm, extending out of the back therein, for allowing a cotter key to be inserted into the distal end of the pin. However, other manners and methods of attaching the two pieces are also envisioned.

While it is preferred that the second arm piece 50 and the linkage piece 30 be two separate pieces able to be connected and disconnected from one another, it is also envisioned that these two pieces could be one integral piece.

The second end 152 of the second arm 50 comprises a connector 170 for connecting the second end 152 of the second arm 50 to the receiver hitch frame, or the frame of the vehicle. In this embodiment, extending from the second end 152 of the second arm 50 is a flange 54. This flange 54 further comprising a frame adapter bracket 56 able to be inserted into the axial bore 86, such as that shown in FIGS. 5 and 7, of the crossbar 84 of the receiver hitch 80. Likewise, other methods of connecting the frame adapter bracket to the crossbar of the hitch are also envisioned. The second arm 50 further comprises at least one accessory, connection receiver 58 for receiving therein the connector portion of an accessory.

Figure 7:
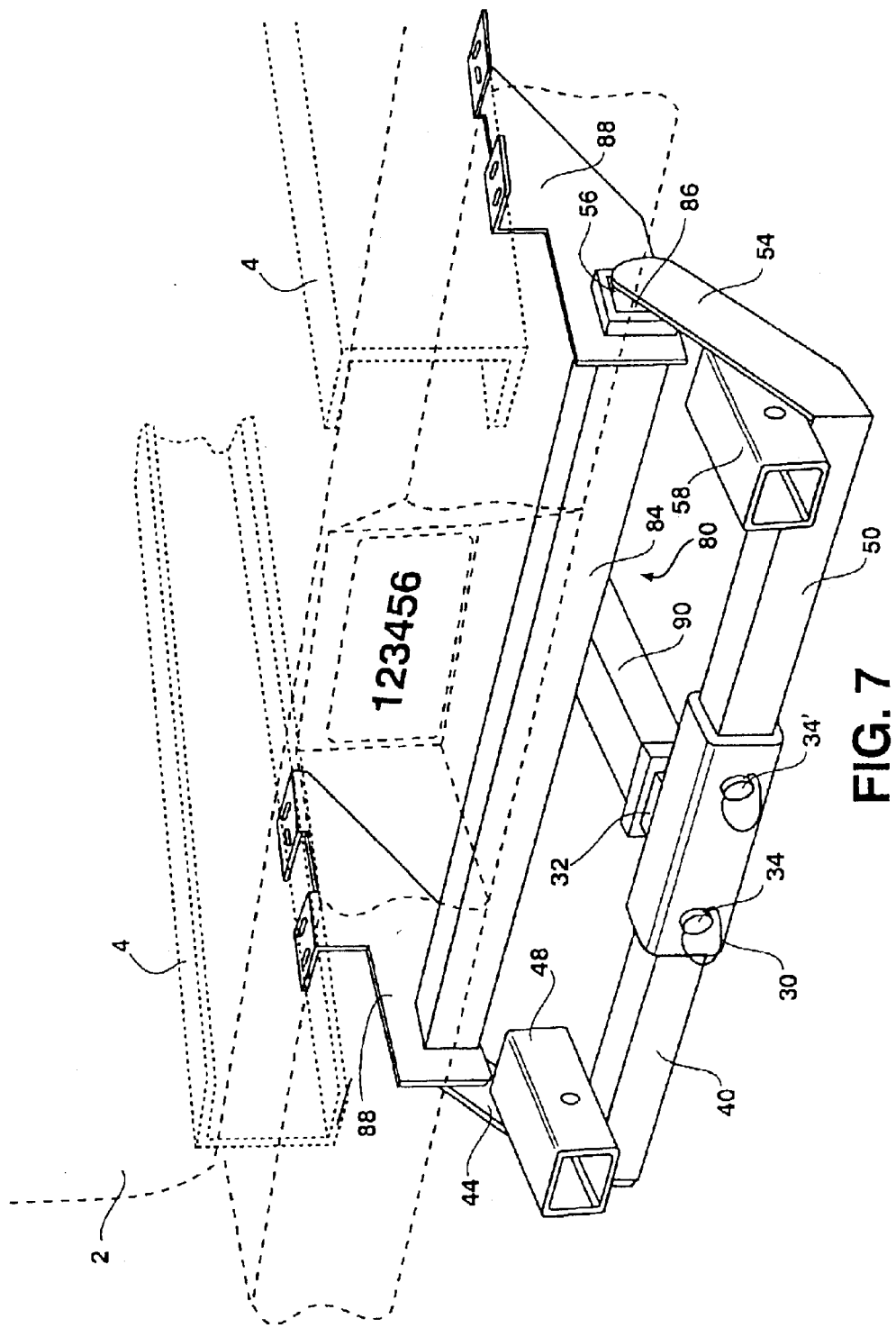
FIG. 7 shows a partial, perspective view of one embodiment of the present invention as installed on a vehicle.

In use, the first frame adapter bracket would be inserted into the axial bore of the crossbar of the hitch on the hitch's driver's side, then the frame adapter bracket of the second arm would be inserted into the axial bore of the crossbar of the hitch at the hitch's passenger side. The engaging tube of the linkage piece would be inserted and attached to the receiver tube of the hitch (as shown in FIG. 7) and the first ends of the first and second arms would then be inserted into the respective first and second ends of the linkage and attached thereto via said pins. Then one or more accessories could be attached to the hitch adapter through connection with one or more of the accessory connection receivers and/or the hitch receiver.

Referring now to FIG. 3, shown is an additional embodiment of the present invention. This embodiment is shown in an exploded view in FIG. 4. In this embodiment, the hitch adapter 10', in comparison to the hitch adapter 10 of FIGS. 1 and 2, does not further comprise a hitch extender 38. This figure is intended to illustrate the fact that components such as the hitch extender 38, the frame adapter bracket 46, and the frame adapter bracket 46, can be absent, present, differently located, or otherwise, for instance the hitch extender 38 could be located on the bottom of the linkage piece 30 rather than on the top (as shown in FIGS. 1 and 2).

Referring now to FIG. 5, shown is a side view of one embodiment of the present invention. This embodiment shows the frame connection 88 of the hitch 80, this frame connection 88 bolted, or otherwise attached to the frame for the vehicle. The frame connection 88 could itself be a portion or extension the vehicle's frame. This connection and relation can likewise be seen in FIG. 7. There are many different types of hitches 80, as well as manners of attaching hitches to vehicle frames, and the embodiment shown is merely shown for illustrative purposes and not intended to be a limitation of the types of frames and/or hitch assemblies upon which the present invention can be utilized.

The hitch 80 having a crossbar 80 that defines an axial bore 86 therein. In the embodiment shown, the crossbar 84 comprises a length of square tubing thereby defining a square axial bore. It is within this axial bore 86 that the frame adapter bracket 56 (as well as the frame adapter bracket 46 on the opposite end) would be inserted. This frame adapter bracket 56 extends via flange 54 to the second arm 50. This second arm 50 as shown connecting to the linkage piece 30 which itself is attached to the receiver tube 90 via the engaging tube (32 in FIG. 2). Configured for attachment to the accessory connection receiver 58, is shown an accessory, namely a trailer hitch ball 100 accessory. While it is much more likely that a hitch ball would be attached to a hitch extender 38 (as shown in FIGS. 1 and 2), the hitch ball or any other accessory could be connected to the accessory connection receivers.

Figure 6:
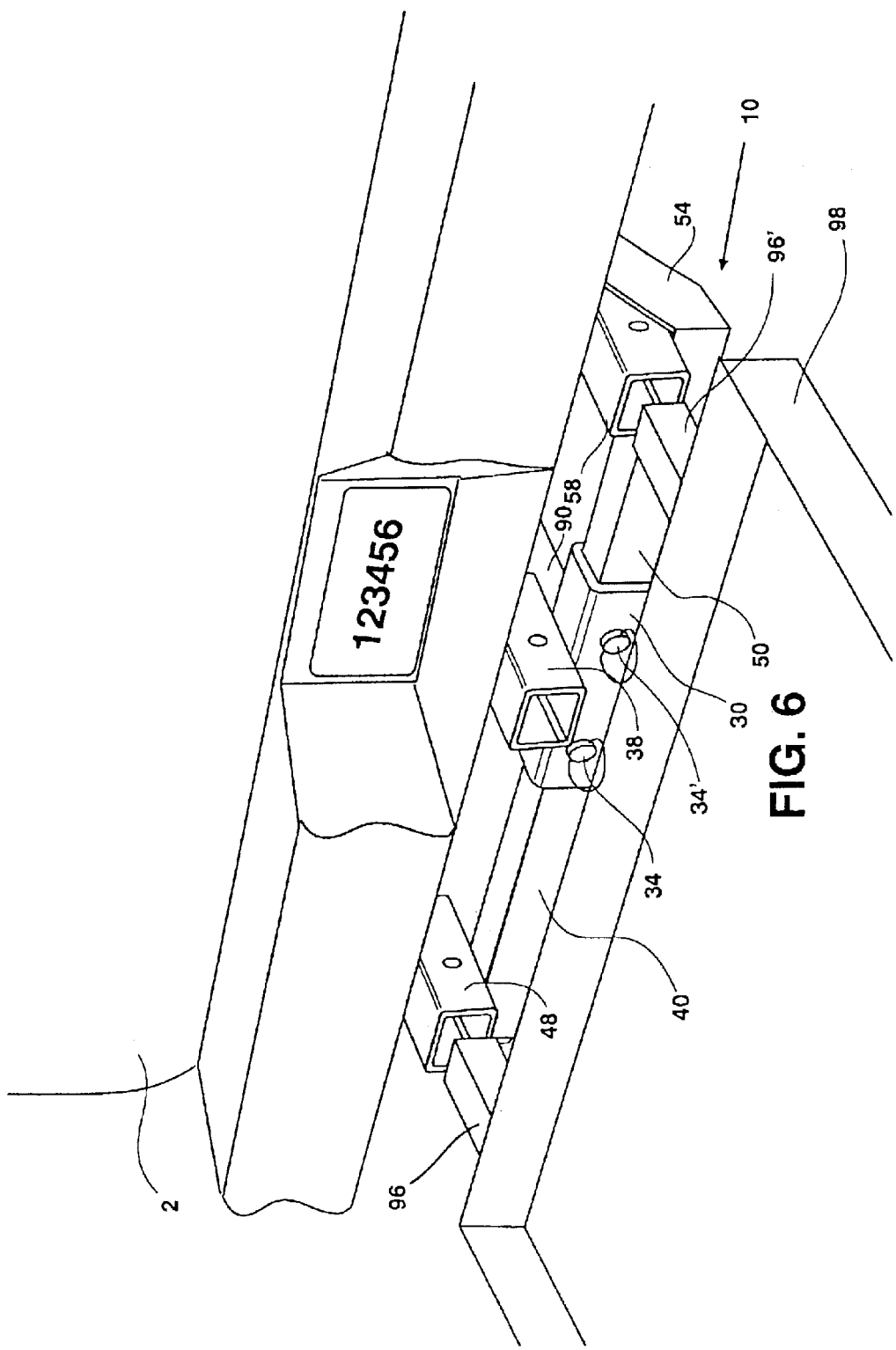
FIG. 6 shows a perspective view of one embodiment of the present invention shown adjacent a hitch accessory.

Referring now to FIG. 6, shown is another embodiment of the present invention. In this embodiment, the hitch adapter 10 is shown attached to the receiver hitch (not shown). This attachment would preferably be in a similar manner to what is shown in FIG. 7. Referring back to FIG. 6, shown is a generic "accessory" 98. This accessory shown comprises a platform having a pair of accessory connectors 96, 96' for interfitting connection with the accessory connection receivers 48, 58. The kinds and types of accessories 98 that may be utilized with the present invention include, but are not limited to, bicycle carriers, motorcycle carriers, platforms for hauling cargo, such as rotor tillers, electric or hydraulic lift platforms, storage compartments and bins, truck bed and roof rack extenders, dump buckets, and any and all other suitable accessories. Additionally, these accessories could further be supported through attachment of additional accessory connectors with the hitch extender 38 of the linkage portion.

Referring now to FIG. 7, shown is a partial view showing a vehicle 2. This vehicle 2 has a frame 4 onto which the hitch's frame connections 88 are attached, preferably through the use of bolts (not shown). The hitch 80 has a crossbar 84 defining an axial bore 86 extending therethrough. This axial bore 86 receiving therein the frame adapter brackets 46, 56 (not shown). The engaging tube 32 of the linkage portion 30 attaching to the receiver tube 90 of the hitch 80, preferably in the standard manner. The first arm 40 and the second arm 50 connecting at the linkage 30. This embodiment showing the utilization of two separate accessory connection receivers, however more or less connection receivers may be present.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A hitch adapter for connecting an accessory to a receiver hitch, said receiver hitch having a crossbar extending between a frame first end and a frame second end, said frame first end connected to a vehicle frame first portion, said frame second end connected to a vehicle frame second portion, said hitch frame further comprising a receiver tube extending generally perpendicular to said crossbar, said receiver tube for receiving an engaging tube of a hitch accessory, said hitch adapter comprising:

an adapter body, said adapter body comprising a first arm piece, a second arm piece and a linkage piece, said adapter body for providing a connection between said accessory and said receiver hitch;

said first arm piece comprising a first frame adapter bracket configured to releasably engage said vehicle frame first end and at least one accessory connection receiver for receiving an engaging tube of an accessory, said first arm piece configured to releasably attach to said linkage piece;

said second arm piece comprising a second end adapter bracket configured to releasably engage said vehicle frame second end and at least one accessory connection receiver for receiving an engaging tube of an accessory, said second arm piece configured to releasably attach to said linkage piece; and said linkage piece configured for releasable engagement to said receiver tube, said linkage piece further comprising a first arm connection for connecting with said first arm and a second arm connection for connecting with said second arm.

* * * * *